United States Patent
Guo et al.

(10) Patent No.: US 10,655,198 B2
(45) Date of Patent: May 19, 2020

(54) METHOD AND APPARATUS FOR RETRIEVING VALUABLE METALS STEP BY STEP FROM WASTE PRINTED CIRCUIT BOARD PARTICLES

(71) Applicant: University of Science and Technology Beijing, Beijing (CN)

(72) Inventors: Zhancheng Guo, Beijing (CN); Long Meng, Beijing (CN); Lei Guo, Beijing (CN); Jintao Gao, Beijing (CN); Yiwei Zhong, Beijing (CN); Zhe Wang, Beijing (CN); Kuiyuan Chen, Beijing (CN)

(*) Notice: Subject to any disclaimer, the term of this patent is extended or adjusted under 35 U.S.C. 154(b) by 147 days.

(21) Appl. No.: 15/690,281

(22) Filed: Aug. 30, 2017

(65) Prior Publication Data
US 2018/0187285 A1    Jul. 5, 2018

(30) Foreign Application Priority Data
Jan. 5, 2017 (CN) .......................... 2017 1 0006864

(51) Int. Cl.
*C22B 11/02* (2006.01)
*C22B 7/00* (2006.01)
(Continued)

(52) U.S. Cl.
CPC .............. *C22B 11/025* (2013.01); *C22B 4/04* (2013.01); *C22B 4/06* (2013.01); *C22B 7/004* (2013.01);
(Continued)

(58) Field of Classification Search
CPC .. C22B 4/04; C22B 4/06; C22B 7/004; C22B 7/005; C22B 9/023; C22B 11/025;
(Continued)

(56) References Cited

U.S. PATENT DOCUMENTS 9,328,398 B2 * 5/2016 Xu ........................... B03B 9/061

FOREIGN PATENT DOCUMENTS

GB    191500074 A  *  3/1916  ............. C22B 7/004

OTHER PUBLICATIONS

Yang, Yuhou; Bo Song, Gaoyang Song, & Shujian Jia. "Removing Impurity Element of Copper from Pb-3%Cu Melt by Super Gravity." TMS (The Minerals, Metals & Materials Society) Annual Meeting Supplemental Proceedings. pp. 81-88 (Year: 2015).*

(Continued)

*Primary Examiner* — Tima M McGuthry-Banks
(74) *Attorney, Agent, or Firm* — Erson IP (Nelson IP)

(57) ABSTRACT

A method and apparatus for step-by-step retrieving valuable metals from waste printed circuit board particles. Many kinds of metals, most existing in form of elementary substance or alloy, are contained in the waste printed circuit boards. Molten metals are separated selectively by supergravity separation at different temperatures to achieve the step-by-step recovery. Tin-based alloys, lead-based alloy, zinc aluminum alloy, crude copper and precious-metal-enriched residues with different metal contents are separated out and collected on the condition of different temperatures (T=200~300° C., 330~430° C., 700~900° C., 1100~1300° C.) and controlling the gravity coefficient (G=50~1000) and separation time (t=2~20 min) etc. Different metals or alloys can be separated quickly and efficiently and the residue concentration of precious metals can be obtained. The process is simple and low cost to provide an efficient way to recovery the enrichment of valuable metals from electronic wastes.

1 Claim, 2 Drawing Sheets

(51) Int. Cl.
*C22B 13/02* (2006.01)
*C22B 25/06* (2006.01)
*C22B 15/00* (2006.01)
*C22B 4/04* (2006.01)
*C22B 4/06* (2006.01)
*C22C 1/02* (2006.01)
*C22B 9/02* (2006.01)

(52) U.S. Cl.
CPC ............ *C22B 7/005* (2013.01); *C22B 13/025* (2013.01); *C22B 15/0056* (2013.01); *C22B 25/06* (2013.01); *C22C 1/02* (2013.01); *C22B 9/023* (2013.01); *Y02P 10/214* (2015.11)

(58) Field of Classification Search
CPC ... C22B 13/025; C22B 15/0056; C22B 25/06; C22C 1/02
See application file for complete search history.

(56) References Cited

OTHER PUBLICATIONS

Li Jing-wei, Guo Zan-cheng, Tang Hui-qing, Wang Zhi, & Sun Shi-tong. "Si purification by solidification of Al—Si melt with super gravity." Tans. Nonferrous Met. Soc. China vol. 22. pp. 958-963. doi: 10.1016/S1003-6326(11)61270-3 (Year: 2012).*

Meng, Long; Zhe Wang, Yiwei Zhong, Lei Guo, Jintao Gao, Kuiyuan Chen, Huijing CHeng, & Zhancheng Guo. "Supergravity separation for recovering metals from waste printed circuit boards." Chemical Engineering Journal 326 pp. 540-550. (Year: 2017).*

* cited by examiner

METHOD AND APPARATUS FOR RETRIEVING VALUABLE METALS STEP BY STEP FROM WASTE PRINTED CIRCUIT BOARD PARTICLES

CROSS-REFERENCE TO RELATED APPLICATIONS

This application claims priority to Chinese Patent Application No. 201710006864.8 with a filing date of Jan. 5, 2017. The content of the aforementioned application, including any intervening amendments thereto, are incorporated herein by reference.

TECHNICAL FIELD

The present invention belongs to the technical field of resource recovery and reuse. In particular the invention relates to a method and an apparatus for retrieving valuable metals step by step from waste printed circuit board particles.

BACKGROUND OF THE PRESENT INVENTION

With the rapid development of the electronic industry and information technology industry, the replacement of electronic products is becoming faster and the product life cycle shorter, so a large number of electronic products are discarded to forming plentiful electronic wastes. There are large amounts of toxic and harmful substances, for example, heavy metals, such as lead, mercury, cadmium and chromium etc. in electronic wastes especially in electronic circuit boards. If these wastes were handled improperly, the ecological environment and human health would be faced with a great threat. Therefore, retrieving metals from the waste electronic circuit boards demands prompt solution.

At present, the methods of retrieving metals from waste printed circuit boards mainly cover pyrometallurgy, hydrometallurgy and physical methods. Conventional pyrometallurgy and hydrometallurgy have developed to maturation and have been used widely, but there are so many problems, such as serious pollution, long process, high cost and more waste acid and waste liquid, that these methods could not satisfy the requirements of today's resource recovery and environmental protection. The physical method is the earliest and most widely used separation and recovery method of electronic wastes, which means the materials are retrieved through gravity separation, magnetic separation, electric separation and flotation-separation based on the differences of the density, particle size, magnetic and conductive properties of the substances in the circuit board. As a physical method, supergravity separation can separate different materials selectively depending on differences of densities and melting points to aim the recovery rapidly under the condition of gravity field. Supergravity separation technology, as a kind of potential separation process, not only could enrich and separate metals fast and efficiently but also have advantages of low labor intensity, good environmental conditions, small equipment, low energy consumption and cost, easy to scale production etc.

SUMMARY OF PRESENT INVENTION

There are many kinds of metals, most of that exist in the form of elementary substance or alloy, in waste printed circuit boards. In the present invention, and most of them exist in the form of The melting point of the invention of the waste printed circuit board is different, the use of high gravity separation technology can quickly and efficiently gradually separated with different content of metal tin-based alloys, lead-based alloy, zinc aluminum Alloy, crude copper and precious-metal-enriched slag with different metal contents are separated step by step rapidly and efficiently by supergravity separation based on the different melt temperatures of the metal in the electronic circuit boards, so that the waste resource can be recycled effectively. The present invention relates to the process method and the key apparatus.

An apparatus for retrieving valuable metals step by step from particles of waste printed circuit boards for realizing to retrieve metals separately through a rotating centrifugal supergravity separation device heated by microwave, the apparatus is comprising of a feeding system, a mobile microwave heating system, a flue gas treatment system, a mobile metal liquid receiver and a driven platform of the rotating centrifugal supergravity separation reactor, where in the rotating centrifugal supergravity separation reactor 10 is equipped with filter plates 11 which is installed in position with the maximum diameter of the rotating centrifugal supergravity separation reactor 10, heating the supplies by the mobile microwave heating system and receiving the metal liquid by a mobile metal liquid receiver 14.

As the FIG. 2 shows, the rotating centrifugal supergravity separation device is composed of the following assemblies:

The feeding system: the feeding system settled in a higher platform 4 is mainly composed of a feeding hopper 1, a spiral feeding rod 2 and a variable frequency motor 3. The waste printed circuit board particles are stored in the feeding hopper 1, and then enter the flue gas treatment system 7 under the action of the rotating spiral feeding rod 2, and falls into the rotating centrifugal supergravity separation reactor 10 under the action of gravity in the end.

The mobile microwave heating system: For heating the electronic waste materials in the rotating centrifugal supergravity separation reactor, a microwave generator 5 with lifting motion is equipped, waveguide tee hybrid rings of the microwave generator are connected with the rotating centrifugal supergravity separation reactor 10 by a sliding conductive sealing ring 6, so that not only were microwave leakage prevented, but also continuous microwave heating can still carried out under the rotation condition of the rotating centrifugal supergravity separation reactor. The microwave generator is connected with the thermocouple 9 or infrared temperature sensor on arranged in the rotating centrifugal supergravity separation reactor by means of the conducting ring installed in sliding conductive sealing ring, therefore the massage of the temperature control in the rotating centrifugal supergravity separation reactor can be transmitted. The microwave generator is a means of microwave generating heads with the hollow-core annular arrangement, and the microwave is output through an annular guided wave tube. Flue pipe 7 of the flue gas treatment system is connected with the rotating centrifugal supergravity separation reactor 10 via the microwave generator 5.

Flue gas treatment system: Electronic wastes contain some organic materials that decompose and produce toxic gas when heated, therefore the electronic wastes should need purification treatment before discharged. The exhaust gas outlet pipe 7 passes through the microwave generator 5 and is connected with the annular microwave outlet pipe in a sliding way, and the exhaust gas generated by the rotating centrifugal supergravity separation reactor 10 is imported into the tail gas treatment tower 8 for purification treatment.

The exhaust gas outlet pipe 7 is connected with the spiral feeding rod 2, and the electronic waste materials fall into the rotating centrifugal supergravity separation reactor 10 via the exhaust gas outlet pipe.

The rotating centrifugal supergravity separation reactor. The outer shell of the rotating centrifugal supergravity separation reactor is made of stainless steel or ordinary steel, the inner shell is heat-resistant steel, and the inside of the inner shell is a layer made of refractory material. Several porous filter plates 11 are installed on the circumference of the maximum inner diameter of the rotating centrifugal supergravity separation reactor, and the melted metal liquid outflows from rotating centrifugal supergravity separation reactor under the action of the gravity but the unmelted particles cannot pass through the porous filter plates. The porous filter plate, made of high temperature resistant metal mesh or porous carbon fibrofelt or porous ceramic plate, can be replaced. The waste printed circuit board particles are supplied from the feeding hopper 1 on the top of the rotating centrifugal supergravity separation reactor. The thermocouple 8 or infrared temperature sensor is equipped on the rotating centrifugal supergravity separation reactor and connected with the microwave generator to test and control the inner temperature of the rotating centrifugal supergravity separation reactor. Two slag discharge holes 12 are fitted on the bottom of the rotating centrifuge supergravity separation reactor 10 to slat off. The rotating centrifugal supergravity separation reactor locates on the annular bearing 19 of the bottom support platform, which is rotated by driving the rotation shaft 13 with the variable frequency motor 18.

The mobile metal liquid receiver: The mobile metal liquid receiver is comprising of two semicircle cylinders 14 that are butted together to collect the metal liquid separated from the rotating centrifugal supergravity separation reactor. When collecting, the two semicircle cylinders are butted through guide rails; when discharging or being repaired, the two semicircle cylinders are separated. There is a receiving groove on the bottom of the semicircle cylinder, and the groove of each semicircle cylinder has a discharging opening at the bottom. When the metal liquid separated from the rotating centrifugal supergravity separation reactor is assembled in the groove via the inside wall of the cylinder, the liquid or the metal particle flows into the tank 15 that is used to store the metal liquid. The mobile metal liquid receiver is coming into a sandwich thermal insulation structure that is 3 layers with innermost layer made of heat-resistant steel material, interlayer made of refractory heat insulation material and outermost layer made of stainless steel or ordinary steel. Besides, the inside of the innermost layer is made of refractory material.

The driven platform of the rotating centrifugal supergravity separation reactor: The platform is mainly made up of a supporting platform 17 and a variable frequency motor 18. The supporting platform, a steel structure, is fixed on the lower foundation platform 16 to support the rotating centrifugal supergravity separation reactor. On the supporting platform, there is an annular bearing 19 fitted, on which the rotating centrifugal supergravity separation reactor 10 settled. The variable frequency motor of the rotating centrifugal supergravity separation reactor is connected with the rotation shaft 13 on the bottom of the rotating centrifugal supergravity separation reactor 10 by a belt or a gear 20. The supergravity coefficient of the particles in the rotating centrifugal supergravity separation reactor can be changed through altering the rotating speed of the variable frequency motor. Two slag receivers 21 are arranged on the supporting platform, preferably symmetrically. The slag or the raw material from the rotating centrifugal supergravity separation reactor 10 flows into the slag receiver 21 via the slag discharging hole 12, and then passes the bottom hole and then the hole of the supporting platform into the slag tank 22.

As the FIG. 1 shows, the implementation steps of the process method include:

Putting the waste printed circuit board particles into the rotating centrifugal supergravity separation reactor via the feeding hopper, and turning on the microwave generator to heat the raw material of the rotating centrifugal supergravity separation reactor and keep the temperature between 200~300° C. Starting the variable frequency motor to keep the centrifugal supergravity coefficient between 50~1000. The tin-based alloy melting liquid flows out through the filter screen from the rotating centrifugal supergravity separation reactor and is collected by the metal liquid receiver that is outside of the rotating centrifugal supergravity separation reactor. The centrifugal rotation duration should be controlled in 2~20 min, and the larger the supergravity coefficient is and the higher the temperature is, the less the duration is needed. The tin-based alloy liquid flows into the metal-liquid tank from the bottom of the metal liquid receiver. Next the metal liquid in the tank can be casted or used as the raw material for other process.

Continuously heating the 1# printed circuit board residues to 330~430° C. after the centrifugal separation in the rotating centrifugal supergravity separation reactor, and centrifuging and separating furthermore to obtain the lead-based metal liquid. The coefficient and the centrifugal rotating duration are similar to those of the step 1).

Continuously heating the 2# printed circuit board residues to 700~900° C. after the centrifugal separation in the rotating centrifugal supergravity separation reactor, and centrifuging and separating continuously to obtain the Zn—Al—Cu alloy liquid. The coefficient and the centrifugal rotating duration are similar to those of the step 1).

Continuously heating the 3# printed circuit board residues to 1100~1300° C. after the centrifugal separation in the rotating centrifugal supergravity separation reactor, and centrifuging and separating continuously to obtain the raw copper liquid. The coefficient and the centrifugal rotating duration are similar to those of the step 1).

Stopping centrifuging and separating. Moving the mobile metal liquid receiver that is comprised of two semicircle cylinders and opening the slag discharging hole of the rotating centrifugal supergravity separation reactor to discharge the slag of the 4# printed circuit board residues after the centrifugal separation in the step 4).

DESCRIPTION OF THE DRAWINGS

These and other aspects and features of the present invention will become clear from the following description taken in conjunction with the preferred embodiments thereof with reference to the accompanying drawing, in which.

DETAILED DESCRIPTION OF PREFERRED EMBODIMENTS

Figure 1:
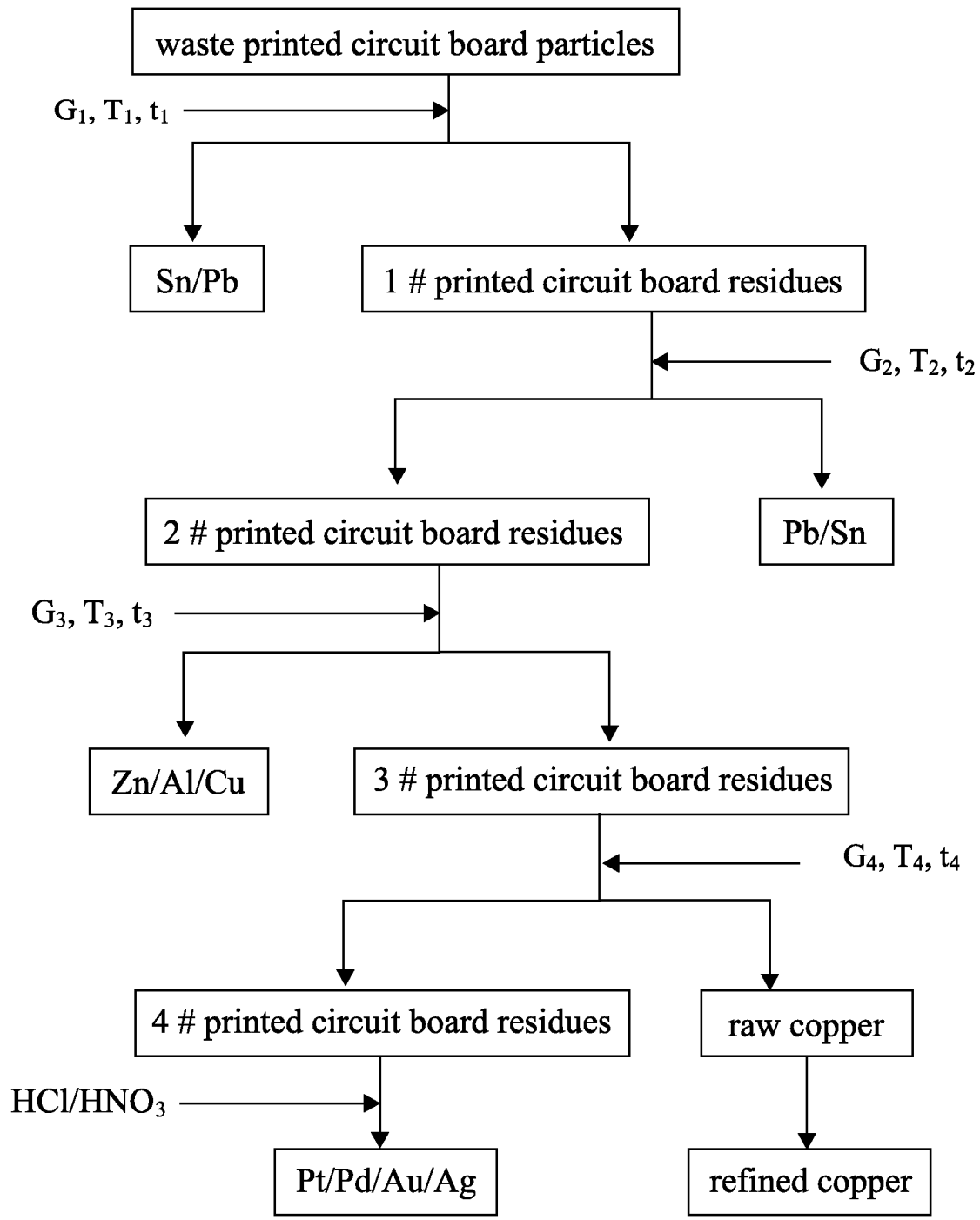
FIG. 1 is a flow chart showing the steps of the method for retrieving valuable metals step by step from waste printed circuit board particles of the present invention.
Figure 2:
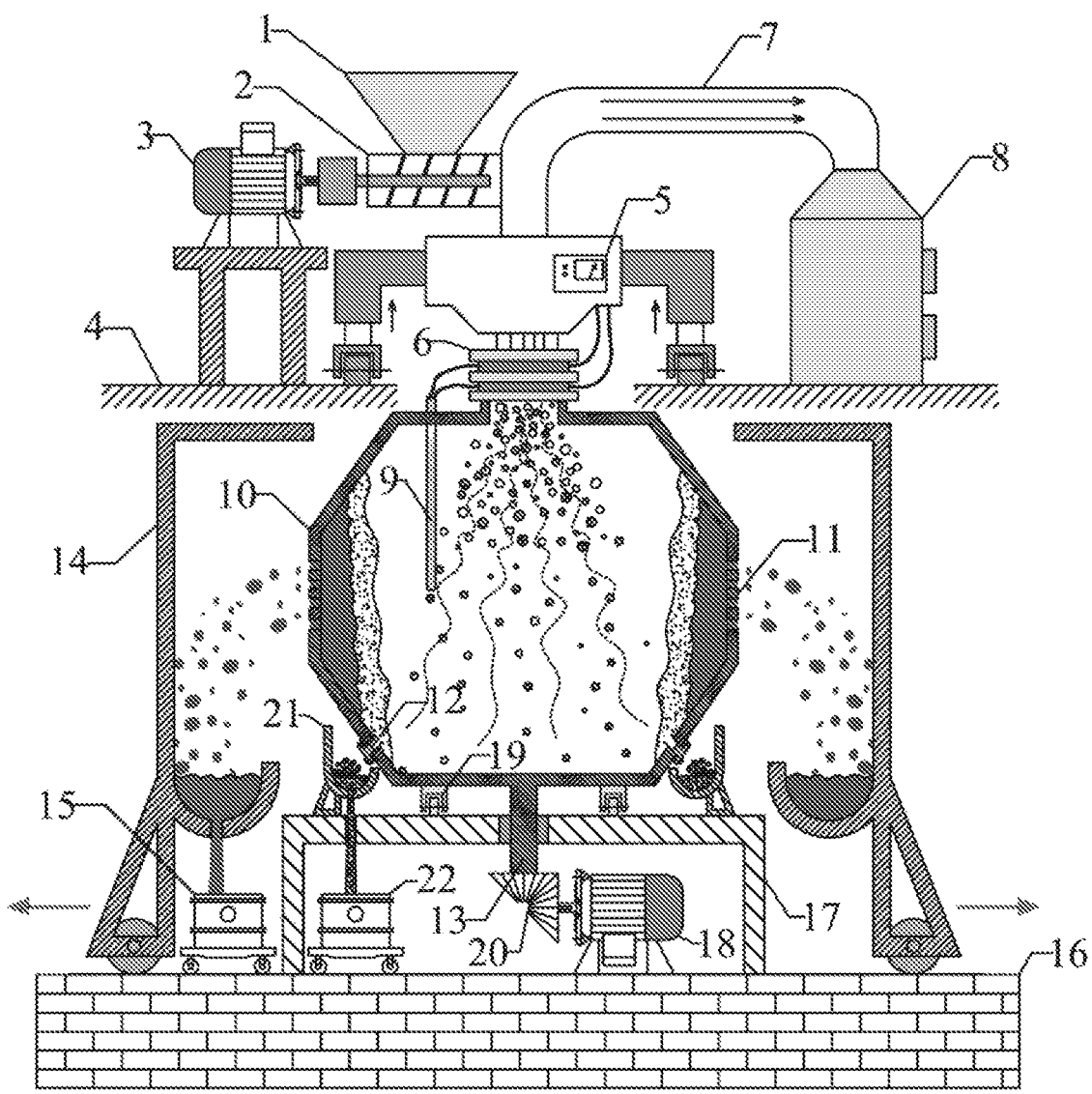
FIG. 2 is a schematic view showing the structure of the apparatus for retrieving valuable metals step by step from the waste printed circuit board particles of the present invention.

Additional features and advantages of the invention will be set forth in the description which follows and in part will be apparent to those having ordinary skill in the art upon examination of the following or may be learned from a practice of the invention. The objective and other advantages of the invention will be realized and attained by the subject matter particularly pointed out in the specification and claims hereof as well as in the appended drawings.

Unless otherwise defined, all terms (including technical and scientific terms) used herein have the same meaning as commonly understood by one of ordinary skill in the art to which this invention belongs. It will be further understood that terms such as those defined in commonly used dictionaries should be interpreted as having a meaning that is consistent with their meaning in the context of the relevant art and the present disclosure, and will not be interpreted in an idealized or overly formal sense unless expressly so defined herein.

Embodiment 1

According to the method and the apparatus for retrieving valuable metals step by step from the waste printed circuit board particles of the present first embodiment, the process of retrieving valuable metals as follows:

The waste printed circuit board particles with the weight of 3.0 kg are put into the cylindrical rotating centrifugal supergravity separation reactor whose outer diameter is 250 mm with lined ceramics and outer shell made of high temperature resistant alloy. The built-in electric heating rod starts to heat the particles until the temperature reaches 280° C. and this temperature is kept for 10 min. The rotating speed of the motor is regulated to make the supergravity coefficient of the position located at the maximum radius of the rotating centrifugal supergravity separation reactor up to 500, and then the particles are rotated and separated for 10 minutes. Accordingly the separated metal that weights 122.5 g totally is the tin-lead alloy with the basis of tin. A post-experimental sampling and analysis indicate that the content of Sn and Pb in the alloy reaches 98.8 wt. % and the mass ratio of Sn and Pb is 2.49.

The 1# printed circuit board residues are heated continuously up to 400° C. holding 10 min. The rotating speed of the motor is regulated to make the supergravity coefficient of the position located at the maximum radius of the rotating centrifugal supergravity separation reactor up to 600, and then the particles are rotated and separated for 5 minutes. Accordingly the separated metal that weights 44.6 g totally is the tin-lead alloy with the basis of lead. A post-experimental sampling and analysis indicate that the content of Sn and Pb in the alloy reaches 95.7 wt. % and the mass ratio of Sn and Pb is 0.55.

The 2# printed circuit board residues are heated continuously up to 800° C. holding 15 minutes. The rotating speed of the motor is regulated to make the supergravity coefficient of the position located at the maximum radius of the rotating centrifugal supergravity separation reactor up to 700, and then the particles are rotated and separated for 5 minutes. Accordingly the separated metal that weights 317.6 g totally is the Zn—Al—Cu alloy. A post-experimental sampling and analysis indicate that the content of Zn, Al and Cu in the alloy reaches 93.2 wt. %. After the chemical analysis it is obtained that the weight of the zinc in the alloy is 101 g, aluminum is 16.9 g and copper is 178 g.

The 3# printed circuit board residues are heated continuously up to 1200° C. holding 20 minutes. The rotating speed of the motor is regulated to make the supergravity coefficient of the position located at the maximum radius of the rotating centrifugal supergravity separation reactor up to 800, and then the particles are rotated and separated for 10 minutes. Accordingly the separated metal that weights 1401.2 g totally is the raw copper. A post-experimental sampling and analysis indicate that the pure of the raw copper reaches 87.8%, which can be used as the raw material for refining copper. The recovery rate of copper is 77.8% in this step.

After the separation and recovery of the above four steps, the total recovery of Sn. Pb, Al, Zn and Cu in the raw materials reached 85.3%, 86.5%, 86.2%, 86.3% and 89% respectively. Finally, the 4# printed circuit board residues (i.e. slags) after the separation are loaded on the balance and the weight of the 4# residues is 695.1 g. The slags are mainly composed of Iron, oxide filler of the circuit board and carbon residues from organic pyrolysis, and enriched of precious metals such as Au, Ag, Pt, Pd etc. The content of Au in the slags is 0.0049 wt. %, Ag is 0.004 wt. %, Pt is 0.0008 wt. % and Pd is 0.0035 wt. % respectively.

Embodiment 2

According to the method and the apparatus for retrieving valuable metals step by step from the waste printed circuit board particles of the present second embodiment, the process of retrieving valuable metals as follows:

The waste printed circuit board particles with the weight of 3.0 kg are put into the cylindrical rotating centrifugal supergravity separation reactor whose outer diameter is 250 mm with lined ceramics and outer shell made of high temperature resistant alloy. The built-in electric heating rod starts to heat the particles until the temperature reaches 250° C. and this temperature is kept for 10 min. The rotating speed of the motor is regulated to make the supergravity coefficient of the position located at the maximum radius of the rotating centrifugal supergravity separation reactor up to 700, and then the particles are rotated and separated for 8 minutes. Accordingly the separated metal that weights 125.5 g totally is the tin-lead alloy with the basis of tin. A post-experimental sampling and analysis indicate that the content of Sn and Pb in the alloy reaches 97.8 wt. % and the mass ratio of Sn and Pb is 2.49.

The 1# printed circuit board residues are heated continuously up to 410° C. holding 10 min. The rotating speed of the motor is regulated to make the supergravity coefficient of the position located at the maximum radius of the rotating centrifugal supergravity separation reactor up to 700, and then the particles are rotated and separated for 5 minutes. Accordingly the separated metal that weights 46.6 g totally is the tin-lead alloy with the basis of lead. A post-experimental sampling and analysis indicate that the content of Sn and Pb in the alloy reaches 95.9 wt. % and the mass ratio of Sn and Pb is 0.56.

The 2# printed circuit board residues are heated continuously up to 850° C. holding 10 minutes. The rotating speed of the motor is regulated to make the supergravity coefficient of the position located at the maximum radius of the rotating centrifugal supergravity separation reactor up to 900, and then the particles are rotated and separated for 5 minutes. Accordingly the separated metal that weights 327.4 g totally is the Zn—Al—Cu alloy. A post-experimental sampling and analysis indicate that the content of Zn, Al and Cu in the alloy reaches 93.8 wt. %. After the chemical analysis it is obtained that the weight of the zinc in the alloy is 102.4 g, aluminum is 17.3 g and copper is 171.1 g.

The 3# printed circuit board residues are heated continuously up to 1200° C. holding 20 minutes. The rotating speed of the motor is regulated to make the supergravity coefficient of the position located at the maximum radius of the rotating centrifugal supergravity separation reactor up to 1000, and then the particles are rotated and separated for 7 minutes. Accordingly the separated metal that weights 1451.6 g totally is the raw copper. A post-experimental sampling and analysis indicate that the pure of the raw copper reaches 86.6%, which can be used as the raw material for refining copper. The recovery rate of copper is 79.4% in this step.

After the separation and recovery of the above four steps, the total recovery of Sn, Pb, Al, Zn and Cu in the raw materials reached 87.5%, 87.6%, 87.8%, 86.3% and 90.2% respectively. Finally, the 4# printed circuit board residues (i.e. slags) after the separation are loaded on the balance and the weight of the 4# residues is 681.3 g. The slags are mainly composed of iron, oxide filler of the circuit board and carbon residues from organic pyrolysis, and enriched of precious metals such as Au, Ag, Pt, Pd etc. The content of Au in the slags is 0.0055 wt. %. Ag is 0.0043 wt. %. Pt is 0.0009 wt. % and Pd is 0.0038 wt. % respectively.

It is to be noted that, by properly combining the arbitrary embodiments of the aforementioned various embodiment, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

We claim:

1. A method for retrieving valuable metals step by step from waste printed circuit board particles, comprising the following steps:

1) putting the waste printed circuit board particles into a rotating centrifugal supergravity separation reactor via a feeding hopper, and heating the particles by microwave and holding a temperature between 200~300° C., and starting a variable frequency motor to drive the rotating centrifugal supergravity separation reactor and control a centrifugal supergravity coefficient between 50~1000, with the supergravity coefficient of particles in the rotating centrifugal supergravity separation reactor to be changed through altering a rotating speed of the variable frequency motor, and separating for 2~20 min, a tin-based alloy melting liquid as a product flows out through a filter screen and 1# printed circuit board residues are also obtained;

2) after the separation in step 1), continuously heating the 1# printed circuit board residues and holding a temperature between 330~430° C., and centrifuging just as the step 1) to obtain a lead-based metal liquid and 2# printed circuit board residues;

3) after the separation in step 2), continuously heating the 2# printed circuit board residues and holding a temperature between 700~900° C., and centrifuging just as the step 1) to obtain a Zn—Al—Cu alloy liquid and 3# printed circuit board residues;

4) after the separation, in step 3), continuously heating the 3# printed circuit board residues and holding a temperature between 1100~1300° C., and centrifuging just as the step 1) to obtain a raw copper liquid and 4# printed circuit board residues;

5) after the separation in step 4), pouring out the 4# printed circuit board residues as precious metal enrichment material.

* * * * *